Feb. 26, 1952     A. A. ERICSON     2,587,449
HYDRAULIC FEED FOR MACHINE TOOLS

Filed Feb. 10, 1945     3 Sheets-Sheet 1

INVENTOR
ALBERT A. ERICSON
BY
Moses, Nolte, Crews & Berry
ATTORNEYS

Patented Feb. 26, 1952

2,587,449

UNITED STATES PATENT OFFICE 2,587,449

HYDRAULIC FEED FOR MACHINE TOOLS

Albert A. Ericson, Massapequa Park, N. Y., assignor to The Farmingdale Corporation, a corporation of New York Application February 10, 1945, Serial No. 577,278

14 Claims. (Cl. 60—51)

1

This invention relates to hydraulic drives for machine tools, and particularly to drives controlling the relative movement of the tool and work so as to control not only the rate of feed, but also to prevent overfeed or overrun of the tool or work in the direction of feed. The invention is also particularly applicable to machine tools in which there is a cutting stroke in both forward and reverse directions of the travel of the parts.

The utility and advantages of the invention are especially apparent in connection with milling machines, and the invention will be described as applied to the operation of such machines. It will be understood, however, that some or all of the features of the invention may be used in the driving and control of other types of machine tools.

In considering the application of the invention to milling, and like machines, it will be apparent that it is frequently desirable to move the carriage of the machine (or the tool in case the feed is accomplished by movement of the tool) so as to bring about feed of the work with respect to the cutter, first in one direction and then in the opposite direction, so that there is no idle stroke. Such reversible feed requires full control over the movements of the carriage in both directions, and the present invention provides instrumentalities by which this may be accomplished. Furthermore, in milling operations there are two distinct conditions to be met with depending upon whether the work is moved in a direction in which its movement is opposed by the rotary cutting action of the tool (standard milling) or whether the rotary action of the tool produces forces acting in the same direction as the feed of the work (climb milling). In the case of climb milling, the rotation of the cutter tends to cause the carriage and work to move too fast and it is very important to properly control the feed so as absolutely to prevent the overfeed or too rapid movement of the carriage. In the event of such overfeed the tendency is for the work to be wedged under the cutter with probable breakage of the cutter, bending of the arbor, or other serious injury. The present invention eliminates such overfeed and therefore is particularly applicable to climb milling.

Features of the invention are applicable to securing a uniform feed, and proper control of feed in the performance of machining operations of various kinds, and in the different types of machine tools, whether operating in one direction only or reversible.

In the accompanying drawings one embodi-

2 bent of the invention has been shown as applied to a milling machine. The invention may however be embodied in other constructions, and applied to various devices in which a feed and control of the character described is desirable.

Figure 1:
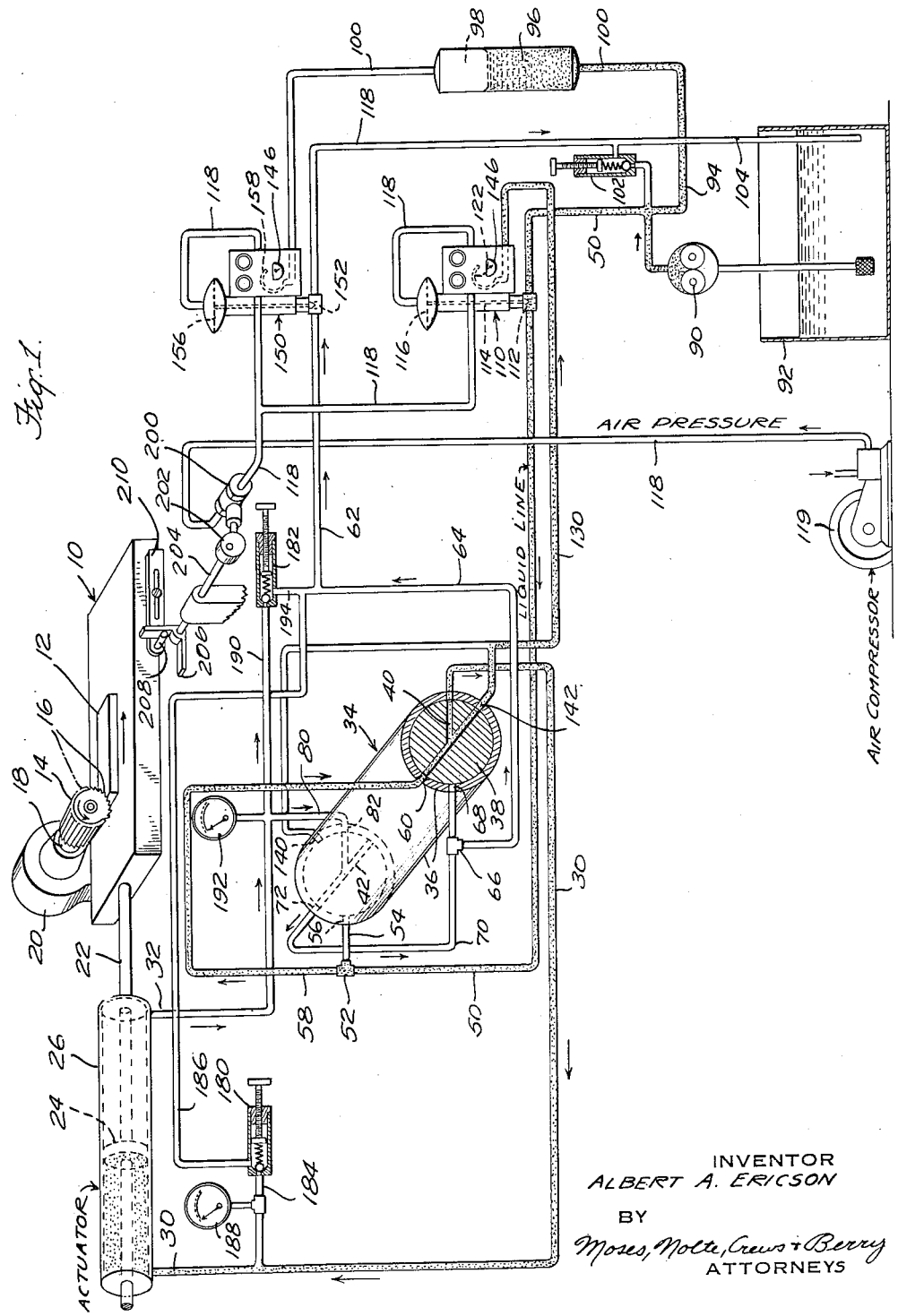
Figure 1 is a diagrammatic perspective view of the illustrative embodiment of the invention showing the control valve set to feed the carriage from left to right.

Referring to the drawings in detail, 10 is the carriage of a milling machine upon which is secured a work piece indicated at 12. 14 is a milling cutter having a plurality of teeth 16, the cutter being mounted on the arbor 18 rotated in any suitable manner as is well known in milling machines. In the present example the arbor of the milling cutter is assumed to be mounted to rotate in a stationary support indicated at 20, while the carriage is moved. If desired the carriage could be stationary and the milling cutter arbor carried by a movable support or both carriage and cutter support could be moved. As shown, the carriage 10 is arranged to be reciprocated by means of a piston rod 22 carrying a piston 24 working in a hydraulic cylinder 26. The cylinder, piston and piston rod may be collectively referred to as the "actuator." Any other form of hydraulically operated actuator may be used.

The ends of the cylinder are connected with pipe lines 30 and 32 which run to a control valve 34 which may be of any suitable type and which acts as a shut-off and reversing valve. The control valve 34, however, differs from known control valves in that it also establishes connection with the pilot control of an automatic pressure regulator as will be described below. In one position of the valve the liquid under pressure is directed to one end of the cylinder through one of the pipes 30 or 32 as the case may be. These pipes therefore respectively act as power lines or exhaust or relief lines depending upon the position of the control valve. The control valve shown for purposes of illustration comprises a cylindrical casing 36 having a rotary plug 38 therein. As illustrated, the plug is provided with two Y-shaped passages, one indicated at 40 near the right hand end of the plug, and the other at 42 (shown in dotted lines) near the left hand end of the plug. The casing 36 has suitable ports with which the passages in the plug are adapted to be brought into registration by partial rotation of the plug.

Figure 2:
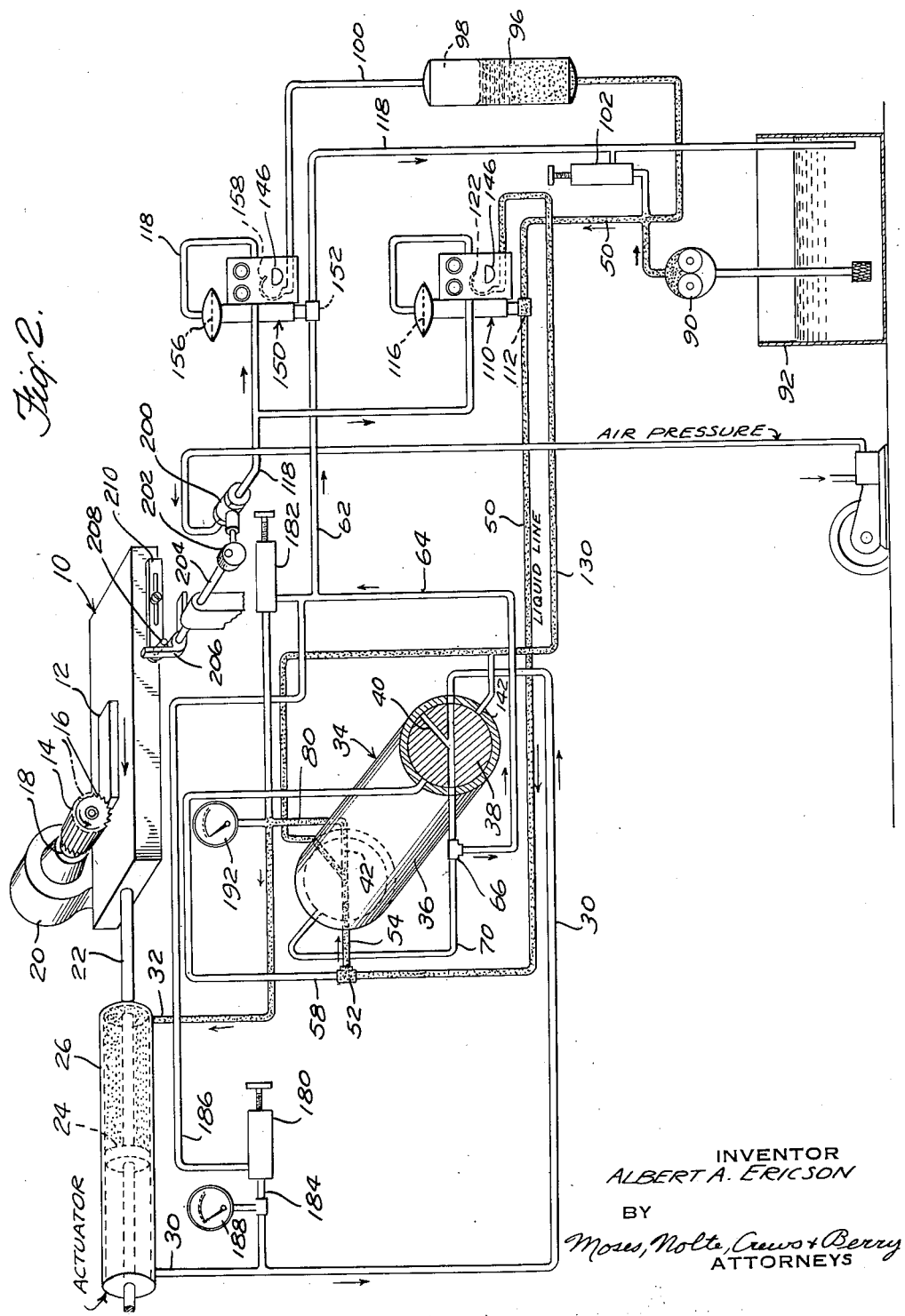
Figure 2 is a similar view with the valve set to feed the carriage from right to left.

Figure 1 shows the plug turned to a position to supply liquid to the left hand end of the actuator cylinder so as to produce movement of the milling machine carriage towards the right. Figure 2 shows the plug 38 moved to a reverse position so as to cause the carriage to travel towards the left. Liquid under pressure is supplied to the control valve through a power line 50, which leads to a T 52 having a branch 54 connected to a port 56 in the left hand end of the valve casing 36 with which one of the branches of the passage 42 is adapted to register in one position of the plug 38. The power line is also connected by pipe 58 extending from the T 52 to a port 60 in the right hand end of the casing 36, this port 60 being adapted to register with a branch of the passage 40. An exhaust or return line 62 is provided which is connected by means of a pipe 64 to a T 66, one branch of which is connected to a port 68 near the right hand end of the casing 36 and adapted to be brought into registration with a branch of the passage 40 in the plug. The return line T 66 is also connected through a loop 70 with a port 72 in the left hand end of the casing 36. Such port is adapted to be brought into registration with a branch of the passage 42.

Figure 1 shows the plug valve turned so that the power passes from the power line 50 through the pipe loop 58, port 60, plug passage 40 and pipe 30 to the left hand end of the actuator cylinder 26, thus moving the carriage 10 to the right. At this time the right hand end of the cylinder is relieved of liquid through pipe 32, pipe 80, port 82 in casing 36, plug passage 42, port 72, pipe loop 70, pipe 64 and return pipe 62.

Figure 2 shows the control valve reversed so that power from the power line is directed to the right hand end of the actuator cylinder through pipe 80 and pipe 32. The liquid is discharged from the left hand end of the cylinder through pipe 30 and the appropriate passages and ports in the control valve to pipe 64 and return line 62.

Power may be supplied for actuating the machine tool feed from any suitable source, such for instance as by means of the system of supply described in my application for patent, Serial No. 567,437, filed December 9, 1944 (now Patent 2,526,646, issued Oct. 24, 1950). For purposes of illustration I have indicated diagrammatically a source of fluid supply comprising a pump 90 drawing actuating fluid from a reservoir 92. Connected with the power line at all times by means of a pipe 94 is an accumulator 96 which has an air space 98 at its upper end in which air is trapped by the liquid in the system. Leading from the air space 98 is an air pipe 100 the purpose of which will be described below. Also connected with the discharge from the pump is a relief valve 102, any overflow from which is discharged through a pipe 104 to the reservoir. This permits the pump to run steadily and provide a continuous supply of liquid under pressure, any liquid not used being returned to the reservoir through the relief valve 102. The setting of the relief valve determines the maximum pressure which may be supplied. The presence of the accumulator is important, its function in cushioning the operations of the tool being set forth and claimed in my application for patent, Serial No. 567,438, filed December 9, 1944.

Figure 3:
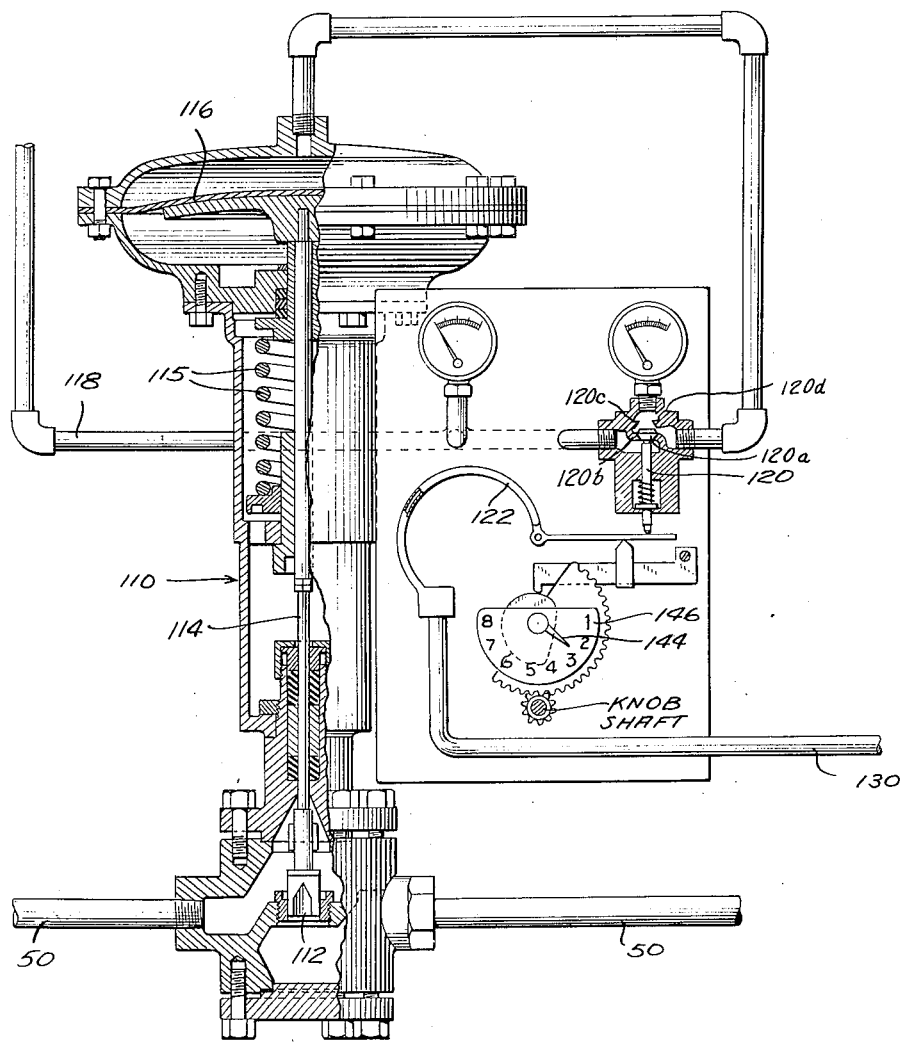
Figure 3 is a view partly in front elevation and partly in vertical section showing one of the automatic pressure regulators used in the system.

An important feature of this invention consists in the provision of automatic regulating means for regulating the pressure of liquid passing through the power line to the actuator and for regulating the discharge from the actuator. In the construction shown regulation of power line pressure is accomplished by means of an automatic regulator or pressure controlled valve indicated generally at 110, and one commercial form of which is shown in Fig. 3. This comprises a throttle valve 112 in the power line which is actuated in any suitable manner, preferably by some external source of power. The throttle valve may be of any suitable form such as a needle valve or "percentage piston valve." In the construction shown, the valve 112 is actuated through the stem 114 which is urged in a direction to open the valve by a spring 115 and is moved in a direction to close the valve by means of a diaphragm 116 which is supplied with pressure from any suitable source such as the shop air line 118. The air pressure from this line is controlled by a pilot valve 120 which is actuated by a pressure responsive element which in the present instance is shown as a Bourdon tube 122. When the Bourdon tube is actuated by variations in pressure applied thereto, the valve 120 is operated, so as to vary the action of the air pressure upon the diaphragm 116 and thereby control the degree of opening of the throttle valve 112, thus regulating the pressure in the power line which passes from the latter through the control valve 34 to one or the other of the ends of the actuating cylinder, depending upon the setting of the control valve at any particular time. The pilot valve 120 includes a head 120a which is adapted at times to seat upon a lower valve seat 120b or an upper valve seat 120c. When the valve head 120a is off its lower seat 120b, the air from the conduit 118 will act upon the upper surface of the diaphragm 116, and when the valve head is off its upper seat 120c, the air trapped in the pipe leading to the diaphragm 116 will escape to the atmosphere through a vent 120d. The pressure responsive element or Bourdon tube 122 is actuated by means of pressure supplied through pipe 130 which is at all times connected to the power line and actuator through the control valve 34. In the particular construction illustrated in Fig. 3, increased pressure on the Bourdon tube increases the opening of the valve 120 to supply air to the space above the diaphragm 116 for reducing the opening of the valve 112, and vice versa. In order to establish connection from the power line to the line 130, the casing 36 is provided with an extra port near each end, the port at the left hand end adapted to register with the plug passage 42 being designated 140, and the corresponding port at the right hand end of the casing being designated 142. With the construction shown it will be seen that the pipe 130 is always in connection with the power line through one or the other of these ports, so that the Bourdon tube 122 is responsive to the pressure in the power line for both directions of feed of the carriage. The regulator 110 is provided with a manually adjustable control which is actuated by setting the hand 144 on the dial 146 in well known manner.

The operation of the regulator 110 is as follows: The hand 144 is set so as to provide for the maintenance of the pressure necessary to secure the desired tool loading or thickness of chip. This loading is selected by considerations of the nature of the work and cut, hardness of the material, character of the tool, etc., as is well understood. The primary function of the automatic regulator is to compensate for changes which may occur in the conditions of operation of the tool. For example, if the nature of the work is such that the depth of the cut decreases suddenly or considerably, so that the load opposing the feed of the work is substantially decreased, and the resistance to movement of the actuator decreased, there will be a tendency for the liquid to surge more rapidly into the actuator cylinder which will result in a momentary decrease in the pressure in the power line. This will result in the decrease in pressure in the line 130 leading to the Bourdon tube 122 in the regulator. Such decrease in pressure in the Bourdon tube permits the tube to curl inwardly which releases pressure on the stem of valve 120 thus permitting valve head 120a to move toward its lower, closed position with respect to flow of air through conduit 118, see Figure 3. Such lowering movement of valve head 120a permits air trapped above diaphragm 116 to escape to atmosphere through port 120d, which permits valve 112 to move to its open position under the urgency of spring 115 acting on diaphragm 116. This increases the flow of liquid in the power line and resultant pressure in the actuator, and thereby compensates for the tendency of the actuator to move at a slow rate upon load removal. On the other hand, if the tool strikes a hard spot or encounters a heavy cut, then the resistance to movement of the carriage and actuator is increased. This tends to slow down the feed, and the pressure in the actuator builds up in the effort to overcome the increased resistance. This results in an increase in pressure in the pipe 130 and Bourdon tube. Such increase in pressure causes the valve 120 to partially or wholly open, thus increasing the air pressure acting on the diaphragm 116. This forces the stem 114 down to decrease the opening of the valve 112, thereby decreasing the pressure of liquid acting in the actuator to compensate for the increased resistance to movement of the carriage. Thus the liquid supplied to the actuator is varied in accordance with the resistance to be overcome.

The construction described above provides means for controlling the application of power, that is liquid under pressure to that end of the cylinder which for the time being is acting as the power end. Obviously upon reversal of the control valve, similar control of the liquid to the other end of the cylinder will be provided. To properly control the movements of the tool or carriage, however, it is in many cases necessary to control the discharge of liquid or relief of pressure from the discharge side of the cylinder as well as to control the power flow leading to the power side. This control may be referred to for convenience as the discharge control as opposed to the power control. In the construction shown the discharge control is accomplished as follows: An automatic regulator or valve 150 is provided for controlling the flow in the return line, this regulator being similar to the regulator 110 described above. Like the former it comprises a valve 152 in the return line actuated from a diaphragm 156 which is actuated by means of air pressure from the shop air line 118. The regulator contains a Bourdon tube 158 which actuates an air valve. In this instance the pressure which actuates the Bourdon tube is air pressure instead of liquid pressure, and such air pressure is that produced in the air space 98 in the top of the accumulator 96 which passes to the Bourdon tube through the pipe 100. The control of the return line by the regulator 150 is independent of the setting of the control valve 34, so that it acts upon the return or discharge from the actuator irrespective of the direction of feed produced by the latter.

The operation of controlling the return line by means of the regulator 150 is as follows: Assuming there is a sudden decrease in the resistance to movement of the carriage 10, caused for instance by a decrease in the depth of cut due to the shape of the work piece, there is a surge of liquid in the power side of the actuator cylinder due to the decrease in resistance and tendency for more rapid movement of the carriage. This surge of liquid decreases the pressure in the power line as already described. It also tends to force more liquid through the return line from the other side of the cylinder. The decrease in pressure in the power line, however, results in an immediate movement of liquid from the accumulator 96 to make up for the surge of liquid through the power line to the actuator cylinder. This lowering of the liquid level in the accumulator causes decrease in pressure in the air space 98 on top of the liquid in the accumulator and thereby results in lowering of the pressure in the pipe 100 and Bourbon tube 158. This results in decreasing the opening of the pilot valve of regulator 150 thereby lowering the air pressure above the diaphragm 156 and increasing the opening of the valve 152 thereby decreasing the throttling of the flow of liquid from the actuator through the return line and permitting more rapid movement of the actuator piston and carriage. On the other hand, if the feed of the carriage encounters an increase in resistance, then the pressure in the power line increases, as already described. This results in an increase in pressure in the accumulator, and an increase in air pressure in the air space 98, pipe 100 and Bourbon tube 158. Such increase tends to close the valve 152, increasing the resistance to flow of the liquid in the return line. This results in increasing the back pressure in the actuator cylinder and thereby prevents the rising pressure in the power side of the cylinder from applying its full power in driving the actuator so as to overcome tendency to increase the pressure of the work against the tool beyond the desired loading in response to increased resistance met with by the tool, and thereby enable the feed of the work to be kept up as near to the desired maximum pressure as possible. This maintains the tool load and chip thickness substantially uniform.

In order to prevent the pressure in the power line and power side of the actuator cylinder from ever building up a dangerous value, it is desirable to provide relief valves between the main control valve and the actuator cylinder, one such valve being provided for each end of the cylinder so that they can operate alternately depending upon which side of the cylinder is for the time being acting as the power side. Such relief valves are shown at 180 and 182. The valve 180 is connected to the line 30 by branch 184 and in the case of the pressure rising to a point higher than that for which the relief valve is set then the surplus liquid is discharged through the pipe 186 to the return line. A gauge 188 may be provided to show the pressure in line 30. The relief valve 182 is connected to the line 32 by branch 190, a gauge 192 being provided to show pressure. Any liquid passing relief valve 182 goes into the return line through a pipe 194, It is often desirable to provide a fast feed for the carriage except during the time when the work is actually passing under the tool. This may be accomplished in the construction of the present invention by providing valve means cutting off the air pressure which actuates the diaphragms 116 and 156 during the times when rapid movement of the carriage is desired. If this air pressure is cut off then the springs in the pressure regulators fully open the valves 112 and 152 thereby permitting application of the full hydraulic pressure available to move the actuator rapidly. Means are preferably provided for automatically turning on the air pressure so as to control the feed just prior to the engagement of the tool with the work. In the construction shown a valve 200 is provided in the air pressure line which is normally closed by a spring (not shown) thus cutting off the air to the pressure regulators. The valve 200 is arranged to be opened by a cam 202 mounted on a shaft 204 which carries a trip rocker 206. The latter is arranged to be tripped by a pin 208 mounted on a slide 210 adjustably secured to the carriage. The slide is adjusted so that the pin 208 will engage the trip lever and rock it so as to rotate the cam 202 and open the valve 200 thereby turning on the air just at the time that the work piece engages the tool. On the return stroke of the carriage after the work piece has passed the tool the trip rocker will be tripped in the opposite direction thereby cutting off the air and permitting the carriage to speed up. Obviously any suitable arrangement of tripping or control devices for accomplishing the desired cycle of operations may be utilized.

From the forgoing description of one particular example of the invention it will be seen that feed control means are provided for a machine tool such as a milling machine or other tool in which similar conditions obtain, in which the relative feed of the work and tool are under complete control in both directions of feed and very quick acting means for regulating and preventing overfeed are provided which will effectively prevent movement of the carriage at a faster rate than the permissible rate of cutting of the tool. Thus there is no danger of breakage or injury of the parts due to overfeed. Very smooth operation and absence of vibration result with attendant high quality of work and saving of wear and tear on the machine. Furthmore the tool is not forced into the work faster than is permissible and undue wear of the tool is thus prevented. The tool can thus be maintained sharp for a longer period of time with corresponding efficiency of operation and high quality of work. At the same time the control of the apparatus is such that the tool may be fed into the work at the highest possible speed compatible with proper operation, so that maxium output can be obtained. Owing to the sensitiveness and efficiency of the regulation, it is safe to use a higher rate of feed than could be successfully employed if the control of feed were less rapid and effective. If it were not for such effective control a much greater factor of safety would have to employed and the normal rate of feed consequently would have to be cut down.

While I have illustrated and described in detail certain preferred forms of my invention, it is to be understood changes may be made therein and the invention embodied in other structures. I do not, therefore, desire to limit myself to the specific construction illustrated, but intend to cover my invention broadly in whatever form its principles may be utilized.

What is claimed is:

1. A hydraulic feed for machine tools comprising an actuator for bringing about relative feed between the tool and the work, a source of liquid under pressure, a pressure line leading from the pressure source to the actuator, an accumulator in said line in communication with the actuator during the machining operation, and an automatic regulator in said pressure line between the source of pressure and the actuator, said automatic regulator including a valve for controlling flow through said pressure line, and air pressure means for actuating said valve.

2. A hydraulic feed for machine tools comprising an actuator for bringing about relative feed between the tool and the work, a source of liquid under pressure, a pressure line leading from the pressure source to the actuator, an accumulator in said line in communication with the actuator during the machining operation, and an automatic regulator in said pressure line between the accumulator and the actuator, said automatic regulator including a valve for controlling flow through said pressure line, and air pressure means for actuating said valve.

3. A hydraulic feed for machine tools comprising an actuator for bringing about relative feed between the tool and the work, a source of liquid under pressure, a pressure line leading from the pressure source to the actuator, an accumulator in said line in communication with the actuator during the machining operation, an automatic regulator in said pressure line between the accumulator and the actuator, a return line leading from the actuator, an automatic regulator in said return line, and connections from the air space of said accumulator to said return line automatic regulator whereby the return line automatic regulator is governed by pressures in the air space of said accumulator.

4. A hydraulic feed for machine tools comprising an actuator for bringing about relative feed between the tool and the work, a source of liquid under pressure, a pressure line leading from the pressure source to the actuator, an accumulator in said line in communication with the actuator during the machining operation, an automatic regulator in said pressure line between the accumulator and the actuator, and a reversing valve in said pressure line between the automatic regulator and the actuator, said automatic regulator including a valve for controlling flow through said pressure line, and air pressure means for actuating said valve.

5. A hydraulic feed for machine tools comprising an actuator for bringing about relative feed between the tool and the work, a source of liquid under pressure, a pressure line leading from the pressure source to the actuator, an accumulator in said line in communication with the actuator during the machining operation, an automatic regulator in said pressure line between the accumulator and the actuator, a reversing valve in said pressure line between the automatic regulator and the actuator, and a connection from said reversing valve to said automatic regulator whereby the automatic regulator is controlled by the pressure in said actuator transmitted through said reversing valve, said automatic regulator including a valve for controlling flow through said pressure line, and air pressure means for actuating said valve.

6. A hydraulic feed for machine tools comprising an actuator for bringing about relative feed between the tool and the work, a source of liquid under pressure, a pressure line leading from the pressure source to the actuator, an accumulator in said line in communication with the actuator during the machining operation, an automatic regulator in said pressure line between the accumulator and the actuator, a reversing valve in said pressure line between the automatic regulator and the actuator, a connection from said reversing valve to said automatic regulator whereby the automatic regulator is controlled by the pressure in said actuator transmitted through said reversing valve, a return line leading from the actuator, an automatic regulator in said return line, and connections from the air space of said accumulator to said return line automatic regulator whereby the return line automatic regulator is governed by pressures in the air space of said accumulator.

7. A hydraulic feed for machine tools comprising an actuator for bringing about relative feed between the tool and the work, a source of liquid under pressure, a pressure line leading from the pressure source to the actuator, a return line leading from the actuator, an accumulator in one of said lines in communication with the actuator during the machining operation, an automatic regulator in the other of said lines, and connections from the air space of said accumulator to said automatic regulator whereby the action of the automatic regulator is governed by pressures in the air space of said accumulator.

8. A hydraulic feed for machine tools comprising an actuator for bringing about relative feed between the tool and the work, a source of liquid under pressure, a pressure line leading from the pressure source to the actuator, a return line leading from the actuator, and automatic regulators in each of said lines, both of said regulators being governed by changes of pressures in the pressure line.

9. A hydraulic feed for machine tools comprising an actuator for bringing about relative feed between the tool and the work, a source of liquid under pressure, a pressure line leading from the pressure source to the actuator, an automatic regulator in said pressure line including a throttle valve in the pressure line, and means for actuating said throttle valve including a pressure responsive valve actuating element, a source of pressure for operating said valve actuating element, a pilot valve for governing the flow of pressure to said valve actuating element, and means responsive to changes of pressure in the pressure line for actuating said pilot valve.

10. A hydraulic feed for machine tools comprising an actuator for bringing about relative feed between the tool and the work, a source of liquid under pressure, a pressure line leading from the pressure source to the actuator, an automatic regulator in said pressure line including a throttle valve in the pressure line, and means for actuating said throttle valve including a pressure responsive valve actuating element, a source of pressure for operating said valve actuating element, a pilot valve for governing the flow of pressure to said valve actuating element, means responsive to changes of pressure in the pressure line for actuating said pilot valve, and means for cutting off the pressure from said valve actuating element for part of the stroke of the actuator so as to free the actuator from control of said automatic regulator during part of the actuator stroke.

11. A hydraulic feed for machine tools comprising an actuator for bringing about relative feed between the tool and the work, a source of liquid under pressure, a pressure line leading from the pressure source to the actuator, an accumulator in said pressure line, a return line leading from the actuator, pressure regulators in said pressure line and return line respectively, each of said pressure regulators including a throttle valve and diaphragm means for actuating the same, an air pressure line for supplying air pressure for actuating said diaphragms, each of said regulators having pilot valve means for controlling the action of the air pressure upon the diaphragm of the respective regulator, means for connecting the pilot mechanism of one of said regulators with the pressure line, and means for connecting the pilot mechanism of the other regulator with the air space at the top of said accumulator.

12. A hydraulic feed for machine tools comprising an actuator for bringing about relative feed between the tool and the work, a source of liquid under pressure, a pressure line leading from the pressure source to the actuator, an accumulator in said pressure line, a return line leading from the actuator, pressure regulators in said pressure line and return line respectively, each of said pressure regulators including a throttle valve and diaphragm means for actuating the same, an air pressure line for supplying air pressure for actuating said diaphragms, each of said regulators having pilot valve means for controlling the action of the air pressure upon the diaphragm of the respective regulator, means for connecting the pilot mechanism of one of said regulators with the pressure line, means for connecting the pilot mechanism of the other regulator with the air space at the top of said accumulator, and means responsive to movements of the actuator for cutting off the supply of air pressure from said regulators during part of the stroke of the actuator.

13. A hydraulic feed system for machine tools comprising an actuator for bringing about relative feed between the tool and the work, and a liquid supply circuit comprising, in order, a reservoir, means for supplying liquid therefrom under substantially constant pressure, a liquid supply line, an accumulator connected to the line, a throttle, a supply connection to the actuator, the actuator, a discharge connection from the actuator, a throttle and a return line to the reservoir, the circuit being arranged so that the force applied by the actuator is controlled by the throttles and is decreased by increasing the throttling and automatic throttle control mechanism responsive to pressure at the actuator for increasing the throttling upon rise of pressure in the high pressure end of the actuator.

14. A hydraulic feed system according to claim 13, comprising also automatic throttle control mechanism responsive to pressure in the accumulator.

ALBERT A. ERICSON.

REFERENCES CITED

The following references are of record in the file of this patent:

UNITED STATES PATENTS

| Number | Name | Date |
|---|---|---|
| 1,905,133 | Bishop et al. | Apr. 25, 1933 |
| 1,996,466 | Ernst | Apr. 2, 1935 |
| 2,005,731 | Ernst et al. | June 25, 1935 |
| 2,034,157 | Stacy | Mar. 17, 1936 |
| 2,272,684 | Vickers | Feb. 10, 1942 |